(12) United States Patent
Fraas et al.

(10) Patent No.: US 6,252,870 B1
(45) Date of Patent: Jun. 26, 2001

(54) METHOD AND ADAPTER DEVICE FOR SWITCHING SWITCHED CONNECTIONS BETWEEN TIME-DIVISION-MULTIPLEX-ORIENTED COMPONENTS OF A COMMUNICATIONS NETWORK VIA AN ATM COMMUNICATIONS NETWORK

(75) Inventors: Wolfgang Fraas, Wolfratshausen; Klaus Hünlich, Neuching; Bernhard Petri, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/494,778

(22) Filed: Jan. 31, 2000

Related U.S. Application Data

(63) Continuation of application No. PCT/DE98/02059, filed on Jul. 22, 1998.

(51) Int. Cl.$^7$ .................................................... H04J 3/16
(52) U.S. Cl. ......................... 370/353; 370/395; 370/410; 370/466
(58) Field of Search .................................. 370/395, 396, 370/410, 522, 524, 352, 353–354, 401, 465, 466, 467

(56) References Cited

U.S. PATENT DOCUMENTS

| | | | |
|---|---|---|---|
| 5,463,621 | 10/1995 | Suzuki ................................ | 370/399 |
| 5,490,141 | * 2/1996 | Lai et al. ............................ | 370/395 |
| 5,982,783 | * 2/2000 | Frey et al. .......................... | 370/410 |
| 5,991,301 | * 2/2000 | Christie ............................... | 370/410 |
| 6,002,689 | * 12/1999 | Christie et al. .................... | 370/410 |
| 6,021,136 | * 2/2000 | Frey et al. .......................... | 370/410 |
| 6,023,474 | * 2/2000 | Gardner et al. .................... | 370/395 |
| 6,081,525 | * 6/2000 | Christie et al. .................... | 370/410 |

FOREIGN PATENT DOCUMENTS

| | | |
|---|---|---|
| 195 02 641 A1 | 7/1996 | (DE) . |
| 195 34 754 C1 | 11/1996 | (DE) . |
| 195 34 755 C1 | 1/1997 | (DE) . |
| 0 603 915 A2 | 6/1994 | (EP) . |
| 2 297 881 | 8/1996 | (GB) . |

OTHER PUBLICATIONS

"Structure of DECT–Standards" (Pilger), 575 Nachrichtentechnik Elektronik 42 (1992), No. 1, Berlin, pp. 23–29.
"SVC Signaling: Calling All Nodes", 8178 Data Communications, No. 8, Jun. 1995, New York, pp. 123–130.
Patent Abstracts of Japan No. 09–107359 (Yutaka), dated Apr. 22, 1997.
"An Advanced Air Interface for Integrated Digital Mobile Communications Systems" (Kitagawa et al.), NTT Radio Communication Systems Laboratories 1–2356, Take, Yokosuka, 238 Japan, pp. 1474–1479.

* cited by examiner

*Primary Examiner*—Alpus H. Hsu
*Assistant Examiner*—Afsar M. Qureshi
(74) *Attorney, Agent, or Firm*—Herbert L. Lerner; Laurence A. Greenberg; Werner H. Stemer

(57) ABSTRACT

In response to a connection setup initiated by a time-division-multiplex-oriented component, an ATM-communications-network-specific destination information item is derived from a specified signaling information item, and an ATM switched connection is automatically set up in the ATM communications network. After a transparent transfer of signaling and useful information via the switched connection that has been set up, the ATM switched connection in question is released. This provides more efficient use of the ATM communications network.

7 Claims, 1 Drawing Sheet

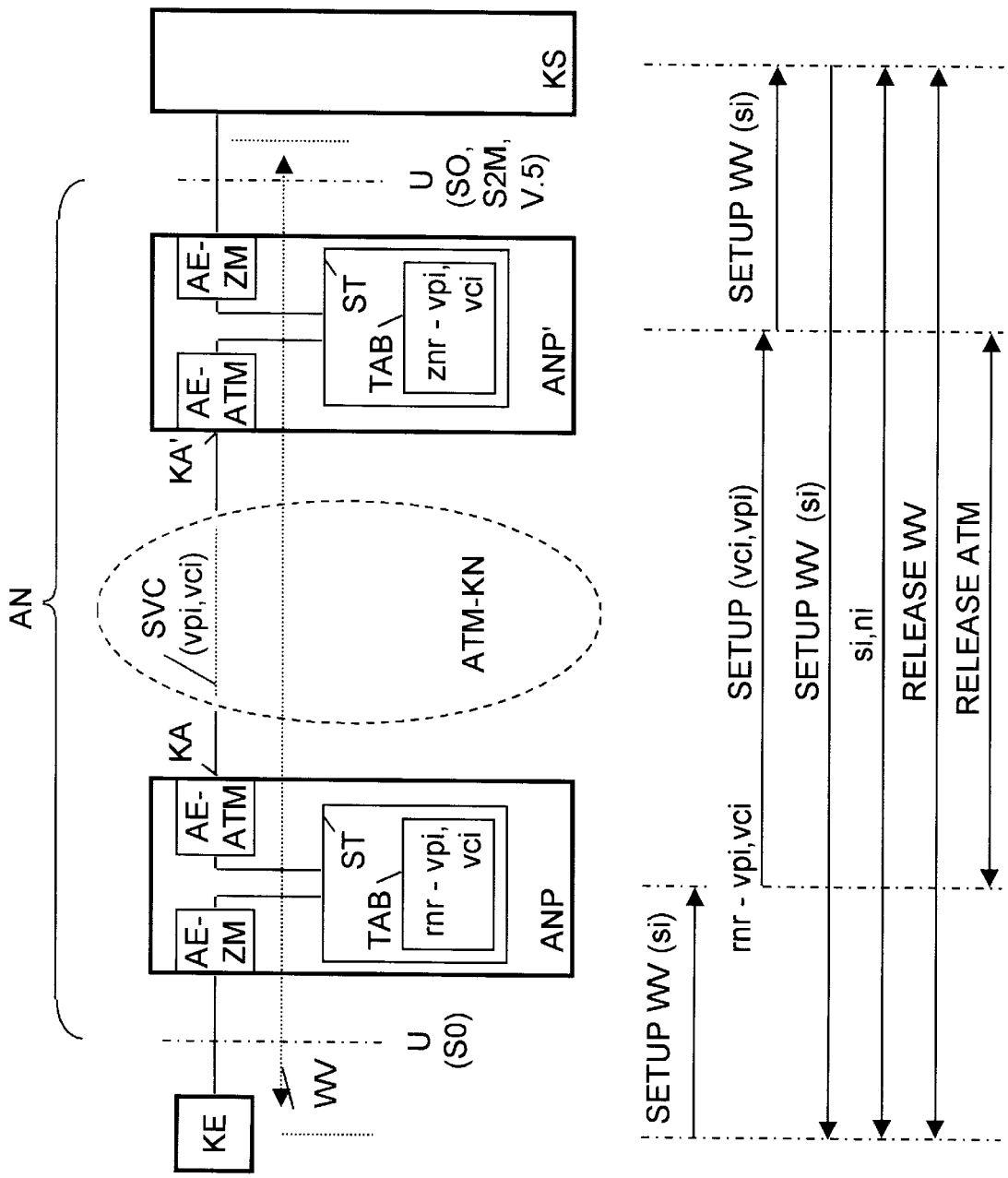

METHOD AND ADAPTER DEVICE FOR SWITCHING SWITCHED CONNECTIONS BETWEEN TIME-DIVISION-MULTIPLEX-ORIENTED COMPONENTS OF A COMMUNICATIONS NETWORK VIA AN ATM COMMUNICATIONS NETWORK

CROSS-REFERENCE TO RELATED APPLICATION

This is a continuation of copending International Application PCT/DE98/02059, filed Jul. 22, 1998, which designated the United States.

BACKGROUND OF THE INVENTION

FIELD OF THE INVENTION

In existing and future time-division-multiplex-oriented communications networks, in particular in ISDN-oriented communications networks, not only are switched connections switched between time-division-multiplex-oriented communications systems via ATM communications networks, but switched connections are also switched in the subscriber's loop of the communications terminals of communications systems via ATM communications networks. For this purpose, as is described for example in German patent DE 42 24 388 C1, permanent virtual connections are established in the ATM communications network. Furthermore, German patent application DE 196 042 44.5 proposes that a permanent virtual connection be established for each communications terminal which is to be connected. As a result of permanent virtual connections being established, the requested switching and transmission resources—in the case of ISDN connections these are two 64 kbit/s telecommunications channels and one 16 kbit/s signaling channel—are continuously made available in the ATM communications network. This leads to an inefficient use of resources in the ATM communications network.

SUMMARY OF THE INVENTION

The object of the invention is to provide a method and adapter device for switching switched connections between time-division-multiplex-oriented components of a communications network via an ATM communications network, which overcomes the above-noted deficiencies and disadvantages of the prior art devices and methods of this kind, and which ensures more efficient use of the transmission and switching resources of switched connections, routed via ATM communications networks, between time-division-multiplex-oriented components of a communications network, in particular in the subscriber's loop of the communications terminals of communications systems.

With the above and other objects in view there is provided, in accordance with the invention, a method for switching switched connections between time-division-multiplex-oriented components of a communications network via an ATM communications network, which comprises:

in case of a connection setup initiated by a time-division-multiplex-oriented component, deriving an ATM-communications-network-specific destination information item from a specified signaling information item;

automatically setting up an ATM switched connection in the ATM communications network based on the derived destination information;

within a scope of the connection setup and of an exchange of information between the time-division-multiplex-oriented components, transferring signaling and user information transparently via the ATM switched connection in the ATM communications network; and in case of a connection release between the time-division-multiplex-oriented components, releasing the respective ATM switched connection in the ATM communications network.

The primary aspect of the solution according to the invention is the fact that, in response to a connection setup initiated by a time-division-multiplex-oriented component, an ATM-communications-network-specific destination information item —i.e. virtual path and channel—is derived from a specified destination information item—in particular the destination call number—and an ATM switched connection is set up in the ATM communications network on the basis of the derived destination information. Subsequently, as part of the connection setup and release and of an exchange of information between the time-division-multiplex-oriented components, signaling and user information relating to the ATM switched connection which has been set up in the ATM communications network is transferred transparently. In response to a connection release between the time-division-multiplex-oriented components, the ATM switched connection in question is released in the ATM communications network. Considerably more efficient use of the switching and transmission resources is possible as a result of an ATM-communications-network-specific virtual path and channel information item being derived from the communications-network-specific destination call number and from a subsequent automatic connection setup via the ATM communications network with the derived virtual path and channel information.

A further significant advantage of the method according to the invention is the fact that in the case of an overload or in the case of a failure of a transmission link or switching component—for example a switching network in the subscriber's loop of communications systems—it is possible to use an alternative route or a different switching and transmission resource. For this purpose, a plurality of ATM communications-network-specific destination information items can be assigned to one communications-network-specific destination information item. As defined in the appended claims, a relationship is predefined between communications-network-specific signaling information and ATM-communications-network-specific destination information, rendering it possible to assign a plurality of ATM-communications-network-specific destination information items to a communications-network-specific destination information item as part of a superordinate switching strategy. As a result of the additional ATM-communications-network-specific destination information, alternative routes are determined which are used in the event of the failure of the usual route or transmission link, or, for example, the prioritized route or transmission link. This means that in the event of a fault or overload the switched connections between time-division-multiplex-oriented components are switched via alternative ATM switched connections. The assignment of ATM-communications-network-specific destination information to communications-network-specific destination information is predefined, or can be predefined via appropriate settings—for example program settings.

In accordance with a further feature of the invention, when switched connections are being switched in the subscriber's loop of communications terminals of time-division-multiplex-oriented communications systems, in case of a connection setup initiated by a communications terminal KE, the specified signaling information is represented by a call number indicating the calling communications terminal; and in case of a connection setup initiated by the communications system, the specified signaling information is represented by a call number of the called communications terminal.

In accordance with again an added feature of the invention, the ATM-communications-network-specific destination information is derived:

from the call number of the called communications terminal in the case of a connection setup initiated by the communications terminal; and from the call number of the called communications terminal in the case of a connection setup initiated by the communications system.

With the above and other objects in view there is also provided, in accordance with the invention, an adapter device for switching switched connections between time-division-multiplex-oriented components of a communications network via an ATM communications network, comprising:

a line unit for connecting to a communications network and a line unit for connecting to an ATM communications network; and a program-controlled control unit connected to the line units, the control unit containing:

an evaluation routine for deriving an ATM-communications-network-specific destination information item from a destination information item specified in a connection setup initiated by a time-division-multiplex-oriented component;

a signaling routine for setting up an ATM switched connection based on the ATM-communications-network-specific destination information item in the ATM communications network;

a transmission device for effecting transparent transfer of signaling and user information via the ATM switched connection, set up in the ATM communications network, as part of the connection setup and release and of an exchange of information between the time-division-multiplex-oriented components; and a signaling routine for releasing the ATM switched connection in case of a connection release between the time-division-multiplex-oriented components.

According to one further refinement of the method according to the invention, in the case of directly successive connection setups between time-division-multiplex-oriented components of the communications network (KN), the ATM switched connection is held. This reduction in the signaling traffic can reduce the dynamic loading of the ATM-oriented or time-division-multiplex-oriented communications network.

The connection setup and release and the exchange of information are advantageously carried out on the basis of the standardized ISDN protocol, the switched connections being advantageously switched between time-division-multiplex-oriented components in the subscriber's loop of the communications terminals of time-division-multiplex-oriented communications systems via ATM switched connections. Owing to the relatively low traffic values per connected communications terminal, the use of the method according to the invention in the subscriber's loop of the communications terminals of communications systems is most effective because the ATM switched connections according to the invention permit switching and transmission resources to be used by a plurality of connected communications terminals, and in addition permit alternative routing of the time-division-multiplex-oriented switched connections in the event of a fault or overload.

Further advantageous refinements of the invention, in particular of an adapter device for implementing the method according to the invention, can be found in the further claims.

Other features which are considered as characteristic for the invention are set forth in the appended claims.

Although the invention is illustrated and described herein as embodied in a method and adapter device for switching switched connections between time-division-multiplex-oriented components of a communications network via an ATM communications network, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE DRAWING

The FIGURE is a schematic diagram of a communications system with time-division-multiplex-oriented communications terminals according to the invention.

DESCRIPTION OF THE PREFERRED EMBODIMENTS

Referring now to the sole FIGURE of the drawing in detail there is seen a schematic block diagram showing time-division-multiplex-oriented communications terminals KE.., which are assigned to a time-division-multiplex-oriented communication system KS—for example to a private communications system in which, according to the invention, the communications terminals KE.. are each connected to an adapter device ANT—for the sake of further explanation the block circuit diagram illustrates in each case one communications terminal KE and one adapter device ANP. The connection of the communications terminals KE.. can be made, for example, either via an ISDN basic access S0 or an ISDN line termination U. Depending on the type of connection, an appropriately implemented line unit AE-ZM is provided in the adapter device ANP. Alternatively, types of connection such as, for example, analog a/b connection or even wireless DECT connection are possible, and in such a case the line unit AE-ZM is to be implemented in accordance with the respective type of connection—in both physical and procedural terms.

By analogy with the connection of a communications terminal KE.., an ATM line unit AE-ATM is implemented in the adapter device ANP in order to make a connection to an ATM communications network ATM-KN. The ATM line unit AE-ATM has an ATM communications line KA, via which the adapter device ANP is connected to the ATM communications network ATM-KN. Furthermore, the adapter device ANP has a control unit ST which is connected to the time-division-multiplex-oriented line unit AE-ZM and the ATM line unit AE-ATM via a bus system B and which implements in programming terms the majority of the procedural properties of the connections S0, U, KA provided in the two line units AE-ZM, AE-ATM. According to the invention, a table TAB in which an original information item—usually the call number rnr of the calling communications terminal KE is assigned an ATM-communications-network-specific destination information item vpi-vci is stored in the control unit ST. The ATM-communications-network-specific destination information vpi, vci is determined by a virtual path information item vpi and by virtual channel information item vci. The ATM-communications-network-specific destination information vpi, vci is defined in such a way that a connection setup, initiated by the communications line KA, to a predefined, i.e. specific, further communications line KA' is implemented.

A further adapter device ANP', which is implemented in the same way, is connected to the further communications line KA'. For the exemplary embodiment it will be assumed that the connection to the time-division-multiplex-oriented communications system KS is implemented by means of an ISDN line termination. Alternatively, terminations such as ISDN basic accesses S0, ISDN primary accesses S2 or the standardized terminations V.5 for feeder networks are possible, in which case the line unit AE-ZM in the further adapter device ANP is to be configured in accordance with the type of termination in question. The procedural properties of the respective terminations KA, U, V and the routines according to the invention are in turn implemented in the control unit ST. In contrast to the control unit ST in the adapter device ANP, a table TAB in which a destination information item, i.e. the call number znr of a called communications terminal KE.. is assigned an ATM communications-network-specific destination information item vpi, vci, i.e. a virtual path and channel information item vpi, vci, is provided in the control unit ST of the further adapter device ANP'. This virtual path and channel information item determines the communications termination KA to which the communications terminal KE.. called by the call number zrn is connected by means of the respective adapter device ANP. This means that in the case of a connection setup initiated by the communications system KS, an ATM switched connection SVC is automatically set up, in accordance with the specified destination call number zrn, to that communications termination KA to which the communications terminal KE.. which is determined by the destination call number zrn is connected.

In the lower part of the block diagram, there is shown a flow diagram which will be used to explain the method according to the invention. In the case of a connection setup SETUP WV (si) initiated by the illustrated communications terminal KE, via the ISDN line termination U an ATM-communications-network-specific virtual path and channel information item vpi, vci is derived automatically in the adapter device ANP, using the table TAB, from the call numbers rnr given in the signaling information si—in particular from the call number rnr of the calling communications terminal KE. The derived virtual path and channel information vpi, vci is used to set up an ATM switched connection SVC to the communications termination KA to which the associated, further adapter device ANP' is connected. Signaling information si for the rest of the connection setup SETUP WV (si) is transferred using the communications system KS via the ATM switched connection SVC which has been set up. After the connection setup SETUP WV (si) has been terminated in the direction of the communications terminal KE, on the basis of ISDN user and signaling information ni, si—for example digitized voice information and signaling information for the performance feature controller—are transferred while there is a switched connection WV.

After the information content has been transferred, the communications terminal KE releases the switched connection WV by means of an appropriate ISDN signaling operation RELEASE WV, and the switched connection WV is released up to the communication system KS—or to the called communications terminal KE—(not illustrated). Subsequently, the ATM switched connection SVC is also released. The switching and transmission resources of the ATM communications network ATM-KN which are taken up by the ATM switched connection SVC are thus released and are available for further communication connections between the communications terminals KE.. which are connected via the ATM communications network ATM-KN. This temporary seizure of switching and transmission resources for the duration of a time-division-multiplex-oriented switched connection WV enables the switching and transmission resources of the ATM communications network to be utilized more effectively to a considerable degree.

In the context of a non-illustrated communications setup initiated from the communications system KS to a communications terminal KE, the ATM-communications-network-specific virtual path and channel information vpi, vci is derived from the destination numbers zrn specified in the signaling information, and an ATM switched connection SVC is set up in accordance with the derived virtual path and channel information vpi, vci, the communications termination KA of the ATM communications network ATM-KN to which the communications terminal KE which is determined by the specified destination call number zrn is connected being determined by the derived virtual path and channel information vpi, vci. The derivation of the virtual path and channel information vpi, vci is effected using the table TAB which is implemented in the other adapter device ANP'.

We claim:

1. A method for switching switched connections between time-division-multiplex-oriented components of a communications network via an ATM communications network, which comprises:

in case of a connection setup initiated by a time-division-multiplex-oriented component, deriving an ATM-communications-network-specific destination information item from a specified signaling information item;

automatically setting up an ATM switched connection in the ATM communications network based on the derived destination information;

within a scope of the connection setup and of an exchange of information between the time-division-multiplex-oriented components, transferring signaling and user information transparently via the ATM switched connection in the ATM communications network;

in case of a connection release between the time-division-multiplex-oriented components, releasing the respective ATM switched connection in the ATM communications network; and when switched connections are being switched in the subscriber's loop of communications terminals of time-division-multiplex-oriented communications systems, in case of a connection setup initiated by a communications terminal KE, representing the specified signaling information by a call number indicating the calling communications terminal; and when switched connections are being switched in the subscriber's loop of communications terminals of time-division-multiplex-oriented communications systems, in case of a connection setup initiated by the communications system, representing the specified signaling information by a call number of the called communications terminal.

2. The method according to claim 1, which comprises, in case of successive connection setups between time-division-multiplex-oriented components of the communications network, holding the ATM switched connection.

3. The method according to claim 1, which comprises carrying out the connection setup, the connection release, and the exchange of information based on the standardized ISDN protocol.

4. The method according to claim 1, wherein the time-division-multiplex-oriented components are implemented in a subscriber's loop of communications terminals of time-division-multiplex-oriented communications systems.

5. The method according to claim 1, which comprises predefining a relationship between communications-network-specific signaling information and ATM-communications-network-specific destination information, rendering it possible to assign a plurality of ATM-communications-network-specific destination information items to a communications-network-specific destination information item as part of a superordinate switching strategy.

6. The method according to claim 1, wherein the deriving step comprises deriving the ATM-communications-network-specific destination information:
- from the call number of the called communications terminal in the case of a connection setup initiated by the communications terminal; and
- from the call number of the called communications terminal in the case of a connection setup initiated by the communications system.

7. An adapter device for switching switched connections between time-division-multiplex-oriented components of a communications network via an ATM communications network, comprising:
- a line unit for connecting to a communications network and a line unit for connecting to an ATM communications network; and
- a program-controlled control unit connected to said line units, said control unit containing:
- an evaluation routine for deriving an ATM-communications-network-specific destination information item from a destination information item specified in a connection setup initiated by a time-division-multiplex-oriented component;
- a signaling routine for setting up an ATM switched connection based on the ATM-communications-network-specific destination information item in the ATM communications network, the routine including
  - in case of a connection setup initiated by a time-division-multiplex-oriented component, deriving an ATM-communications-network-specific destination information item from a specified signaling information item,
  - automatically setting up an ATM switched connection in the ATM communications network based on the derived destination information,
  - within a scope of the connection setup and of an exchange of information between the time-division-multiplex-oriented components, transferring signaling and user information transparently via the ATM switched connection in the ATM communications network,
  - in case of a connection release between the time-division-multiplex-oriented components, releasing the respective ATM switched connection in the ATM communications network, and
  - when switched connections are being switched in the subscriber's loop of communications terminals of time-division-multiplex-oriented communications systems, in case of a connection setup initiated by a communications terminal KE, representing the specified signaling information by a call number indicating the calling communications terminal, and
  - when switched connections are being switched in the subscriber's loop of communications terminals of time-division-multiplex-oriented communications systems, in case of a connection setup initiated by the communications system, representing the specified signaling information by a call number of the called communications terminal;
- a transmission device for effecting transparent transfer of signaling and user information via the ATM switched connection, set up in the ATM communications network, as part of the connection setup and release and of an exchange of information between the time-division-multiplex-oriented components; and
- a signaling routine for releasing the ATM switched connection in case of a connection release between the time-division-multiplex-oriented components.

* * * * *